(12) United States Patent
Abe et al.

(10) Patent No.: US 7,568,539 B2
(45) Date of Patent: Aug. 4, 2009

(54) HYBRID VEHICLE

(75) Inventors: Noriyuki Abe, Saitama (JP); Yoshio Okada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 231 days.

(21) Appl. No.: 10/567,435

(22) PCT Filed: Aug. 13, 2004

(86) PCT No.: PCT/JP2004/011691

§ 371 (c)(1),
(2), (4) Date: Nov. 30, 2006

(87) PCT Pub. No.: WO2005/028233

PCT Pub. Date: Mar. 31, 2005

(65) Prior Publication Data

US 2007/0084649 A1 Apr. 19, 2007

(30) Foreign Application Priority Data

Aug. 18, 2003 (JP) .............................. 2003-294661

(51) Int. Cl.
*B60K 6/02* (2006.01)
(52) U.S. Cl. .................................... 180/65.2; 180/65.6
(58) Field of Classification Search ............... 180/65.1, 180/65.2, 65.4, 65.7
See application file for complete search history.

(56) References Cited

U.S. PATENT DOCUMENTS 4,583,423 A * 4/1986 Hahne ........................ 475/136
4,798,254 A * 1/1989 Lings ......................... 180/58

FOREIGN PATENT DOCUMENTS

| JP | 08-266012 A | 10/1996 |
| JP | 11-180173 | 7/1999 |
| JP | 2000-199442 A | 7/2000 |

(Continued)

OTHER PUBLICATIONS

International Search Report dated Sep. 14, 2004 of PCT/JP2004/011691.

(Continued)

*Primary Examiner*—Christopher P Ellis
*Assistant Examiner*—Bridget Avery
(74) *Attorney, Agent, or Firm*—Westerman, Hattori, Daniels & Adrian, LLP.

(57) ABSTRACT

A hybrid vehicle is provided in which, since the driving force of a generator/motor (M1) is transmitted to the downstream side of an output shaft (17) of a transmission (T) without going through an input shaft (16) thereof and the output shaft (17), it is possible to carry out the so-called leg shaft drive, which prevents the driving force of the generator/motor (M1) from dragging along an engine (E), the input shaft (16), and the output shaft (17), thus reducing power consumption and enhancing energy recovery efficiency during regenerative braking. Furthermore, since the generator/motor (M1) is disposed at a position sandwiched between the engine (E) and the transmission (T), it is possible to employ the same layout for the generator/motor (M1) as for a conventional sandwiched generator/motor type, and the leg shaft drive system can be employed without greatly modifying the design of the transmission (T).

3 Claims, 11 Drawing Sheets

FOREIGN PATENT DOCUMENTS

| | | |
|---|---|---|
| JP | 2000-278809 A | 10/2000 |
| JP | 2002-114048 | 4/2002 |
| JP | 2002-139136 A | 5/2002 |
| JP | 2002-188716 | 7/2002 |
| JP | 2002-204504 | 7/2002 |
| JP | 2002-211250 | 7/2002 |
| JP | 2002-262409 | 9/2002 |
| JP | 2003-127681 | 5/2003 |
| JP | 2003-154861 A | 5/2003 |
| JP | 2003-165359 | 6/2003 |
| JP | 2004-175320 A | 6/2004 |

OTHER PUBLICATIONS

Japanese Office Action dated May 17, 2006.

* cited by examiner

HYBRID VEHICLE

TECHNICAL FIELD

The present invention relates to a hybrid vehicle that can travel by means of either one or both of the driving force of an engine and the driving force of a generator/motor.

BACKGROUND ART

In such a hybrid vehicle, the layout for an engine, a generator/motor, and a transmission that is conventionally employed is in general of a so-called sandwiched generator/motor type in which a thin generator/motor is sandwiched between the engine and the transmission. In the layout of the sandwiched generator/motor type, since the generator/motor is joined to a crankshaft of the engine and an input shaft of the transmission and always rotates integrally therewith, when the generator/motor carries out regenerative braking during deceleration of the vehicle, there are the problems that friction in the engine and the transmission might degrade the energy recovery efficiency, and the friction of the engine is a load on the generator/motor when traveling by means of the generator/motor, thus increasing the power consumption.

A so-called leg shaft drive system hybrid vehicle is known from, for example, Patent Publication 1 below in which the above-mentioned problems have been solved by enabling a generator/motor to be isolated from a crankshaft of an engine and an input shaft of a transmission, and enabling the driving force of the generator/motor to be transmitted to a driven wheel side rather than an output shaft of the transmission.

In this hybrid vehicle, the generator/motor is connected in series via a clutch to an end of the input shaft of the transmission on the side opposite to the engine, and by isolating the generator/motor from the input shaft of the transmission and the crankshaft of the engine by disengaging the clutch, the driving force of the generator/motor can be transmitted directly to the output shaft of the transmission. Patent Publication 1: Japanese Patent Application Laid-open No. 2002-188716

DISCLOSURE OF THE INVENTION

Problems to be Solved by the Invention

However, in the arrangement disclosed in Patent Publication 1 above, since the engine and the generator/motor are disposed at axially opposite ends of the input shaft of the transmission, a sandwiched generator/motor type transmission cannot be used as it is, and there is the problem that, in order to employ the leg shaft drive system, it is necessary to greatly modify the design of the transmission.

The present invention has been accomplished under the above-mentioned circumstances, and it is an object thereof to provide a hybrid vehicle that can employ the leg shaft drive system without subjecting a sandwiched generator/motor type transmission to large-scale design modification.

Means for Solving the Problems

To accomplish the above object, according to a first aspect of the present invention, there is proposed a hybrid vehicle comprising: an engine having a crankshaft; a transmission that has an input shaft joined coaxially to the crankshaft and an output shaft disposed in parallel to the input shaft, and is capable of changing the gear ratio between the input shaft and the output shaft; and a generator/motor that is disposed at a position sandwiched between the engine and the transmission and a position off an axis of the input shaft, and transmits its driving force to any position of a power transmission pathway between the output shaft and a differential gear; the vehicle being capable of traveling by means of either one or both of the driving force of the engine and the driving force of the generator/motor.

According to a second aspect of the present invention, in addition to the first aspect, the generator/motor is disposed coaxially with the output shaft.

According to a third aspect of the present invention, in addition to either the first or second aspect, a starter motor that can crank the crankshaft is disposed at a position sandwiched between the engine and the transmission, and at least parts of the generator/motor and the starter motor overlap each other when viewed in a direction perpendicular to the axis.

According to a fourth aspect of the present invention, in addition to the third aspect, the starter motor is disposed coaxially with the crankshaft.

Effects of the Invention

In accordance with the first aspect, since the driving force of the generator/motor is transmitted to any position of the power transmission pathway between the output shaft of the transmission and the differential gear, it is possible to carry out leg shaft drive in which transmission of the driving force between the generator/motor and the differential gear is carried out without going through the engine and the input shaft, power consumption can be reduced due to a decrease in friction, and the energy recovery efficiency during regenerative braking can be improved. Furthermore, since the generator/motor is disposed at a position sandwiched between the engine and the transmission, the generator/motor can be arranged in the same manner as for the conventional sandwiched generator/motor type, and not only can the leg shaft drive system be employed without greatly modifying the design of the sandwiched generator/motor type transmission, but also the axial dimension does not increase compared with the sandwiched generator/motor type transmission.

In accordance with the second aspect, since the generator/motor is disposed coaxially with the output shaft, it is possible to easily avoid interference between the generator/motor and the output shaft.

In accordance with the third aspect, since the starter motor is disposed at a position sandwiched between the engine and the transmission, it is possible to arrange the starter motor without greatly modifying the design of the sandwiched generator/motor type transmission. In particular, since at least parts of the generator/motor and the starter motor overlap each other when viewed in a direction perpendicular to the axis of the input shaft, any increase in the axial dimension of the transmission can be suppressed effectively.

In accordance with the fourth aspect, since the starter motor is disposed coaxially with the crankshaft, the engine can be started by means of a compact structure, and power can be generated by driving the starter motor by means of the engine.

EXPLANATION OF REFERENCE NUMERALS AND SYMBOLS

15 Crankshaft
16 Input Shaft
17 Output Shaft
19 Differential Gear
E Engine
L Axis of Input Shaft
M1 Generator/Motor
M2 Starter Motor
T Transmission

BEST MODE FOR CARRYING OUT THE INVENTION

Modes for carrying out the present invention are explained below by reference to embodiments of the present invention shown in the attached drawings.

EMBODIMENT 1

FIG. 1 to FIG. 6 show a first embodiment of the present invention.

Figure 1:
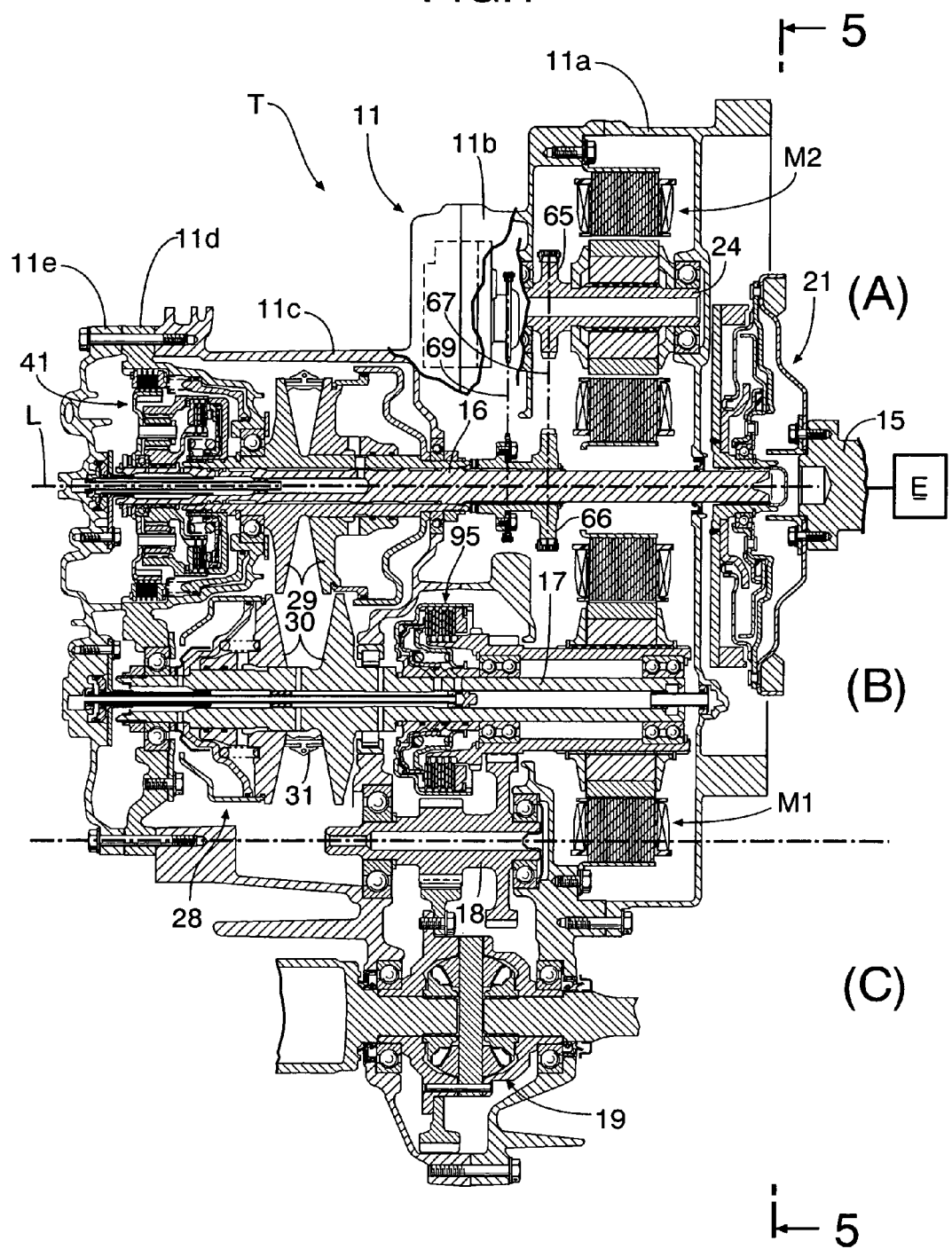
FIG. 1 is a vertical sectional view of a power unit of a hybrid vehicle related to a first embodiment (Embodiment 1).

As shown in FIG. 1, a transmission case 11 of a transmission T mounted in a front part of a vehicle body of a front-engined/front wheel drive vehicle is divided into five, that is, a first casing 11a, a second casing 11b, a third casing 11c, a fourth casing 11d, and a fifth casing 11e. A shaft end of a crankshaft 15 of an engine E faces an opening at the right-hand end of the first casing 11a, and an input shaft 16 (main shaft) of the transmission T, which shares an axis L with the crankshaft 15, is supported in the interior of the transmission case 11. Furthermore, supported within the transmission case 11 are an output shaft 17 (counter shaft) and a reduction shaft 18, which are parallel to the input shaft 16, and disposed beneath the reduction shaft 18 is a differential gear 19.

Figure 5:
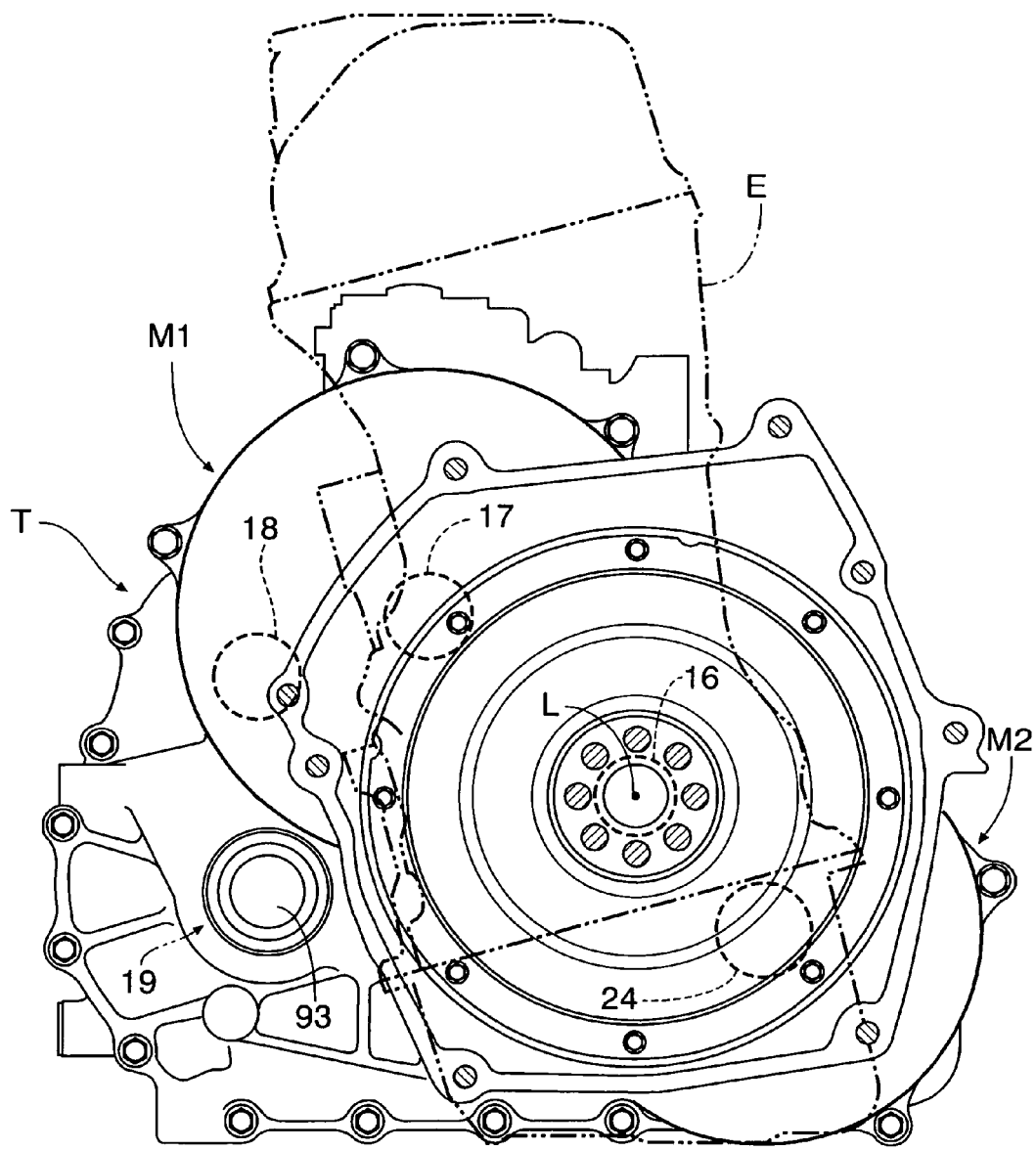
FIG. 5 is a view from arrowed line 5-5 in FIG. 1 (Embodiment 1).
Figure 6:
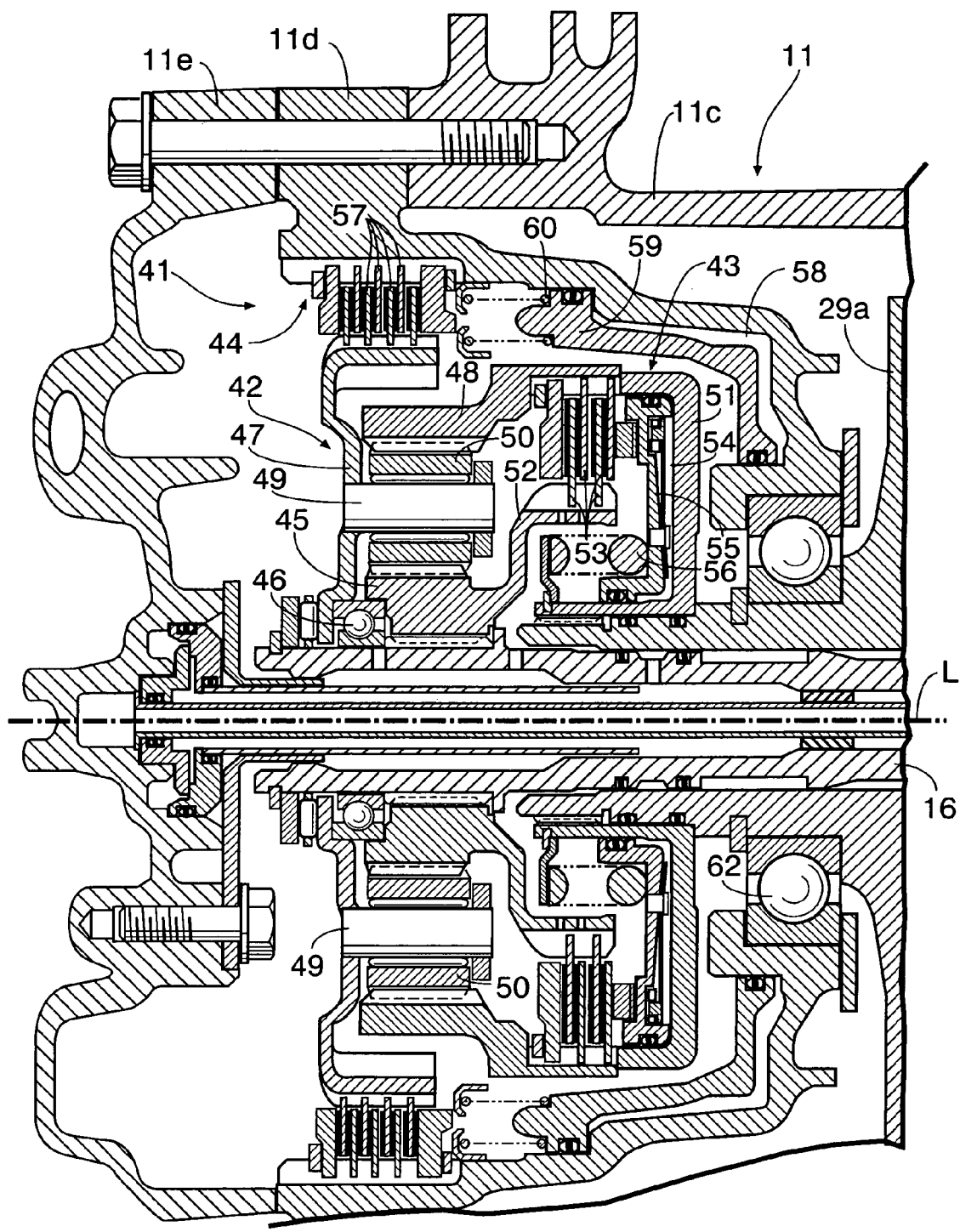
FIG. 6 is an enlarged view of a forward/reverse travel switching mechanism (Embodiment 1).
Figure 7:
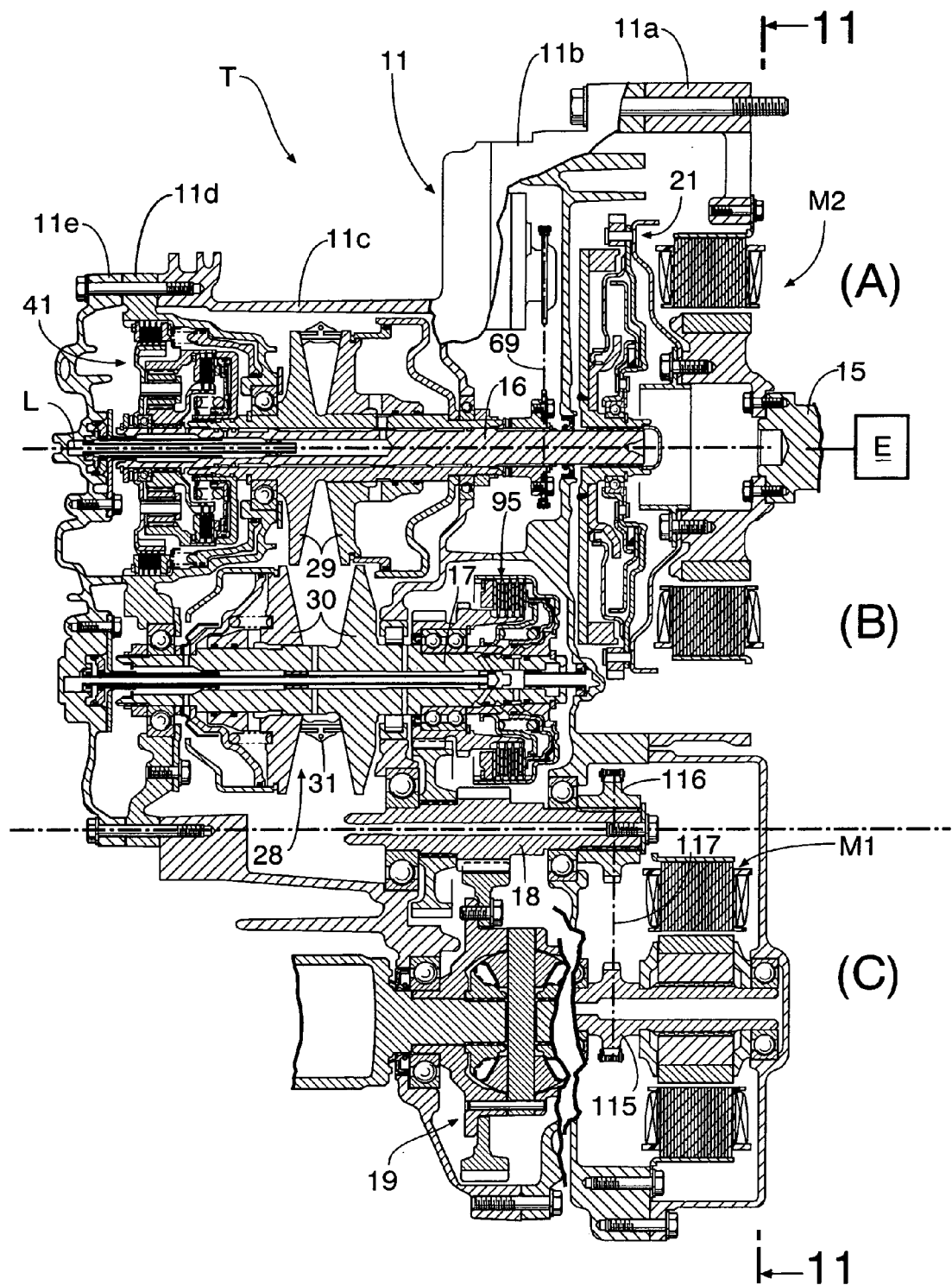
FIG. 7 is a vertical sectional view of a power unit of a hybrid vehicle related to a second embodiment (Embodiment 2).
Figure 8:
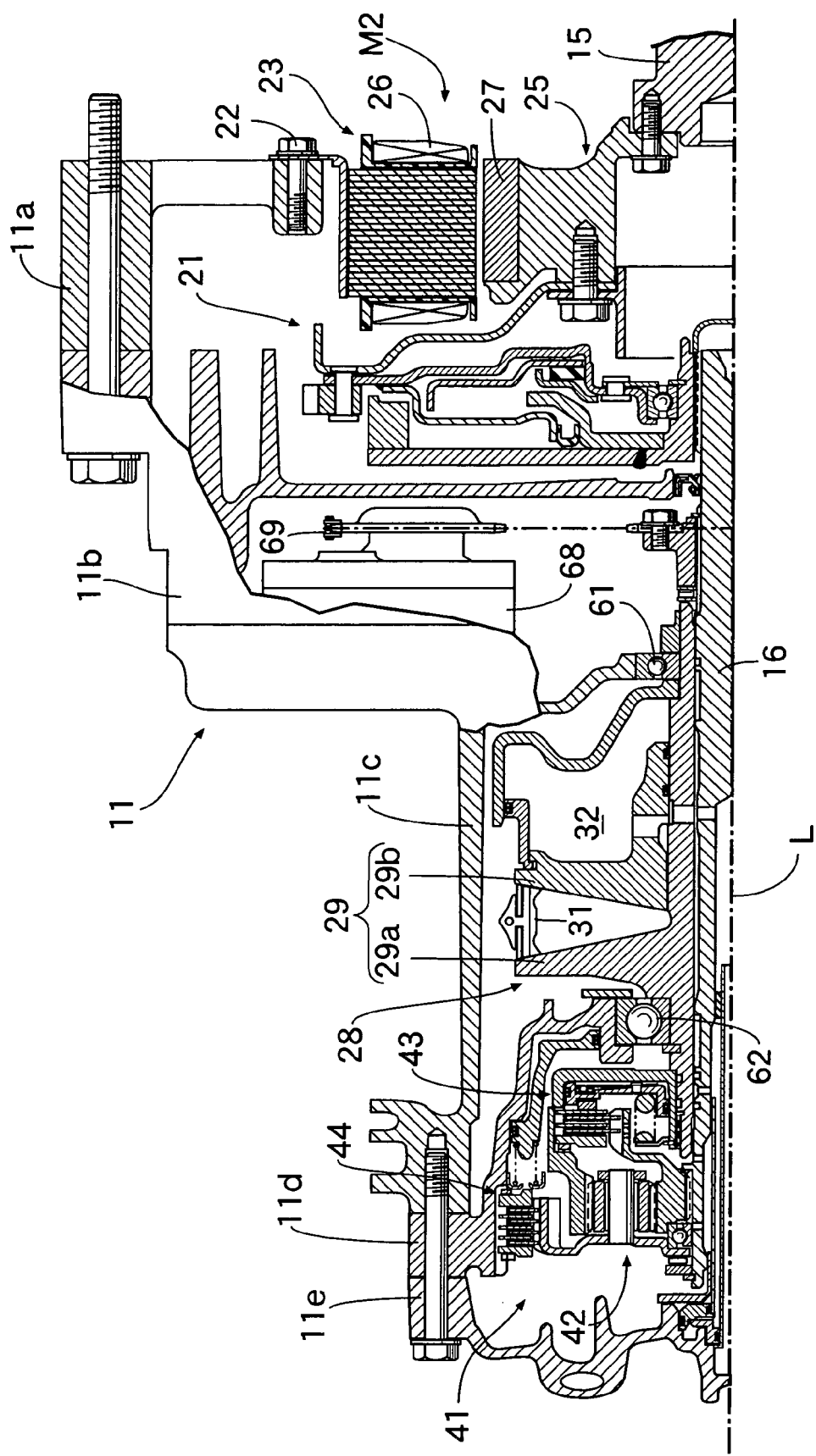
FIG. 8 is an enlarged view of part A in FIG. 7 (Embodiment 2).
Figure 9:
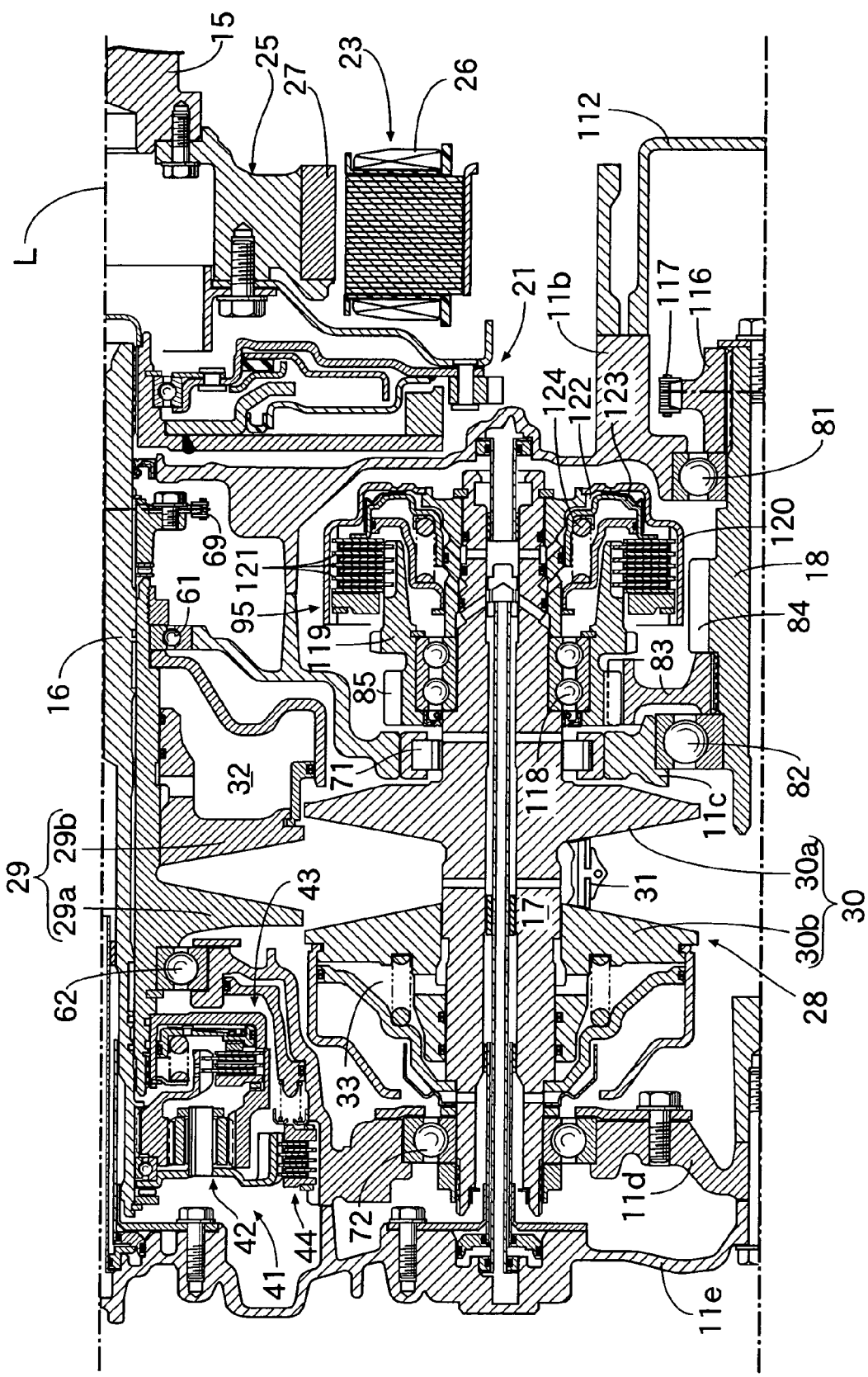
FIG. 9 is an enlarged view of part B in FIG. 7 (Embodiment 2).
Figure 10:
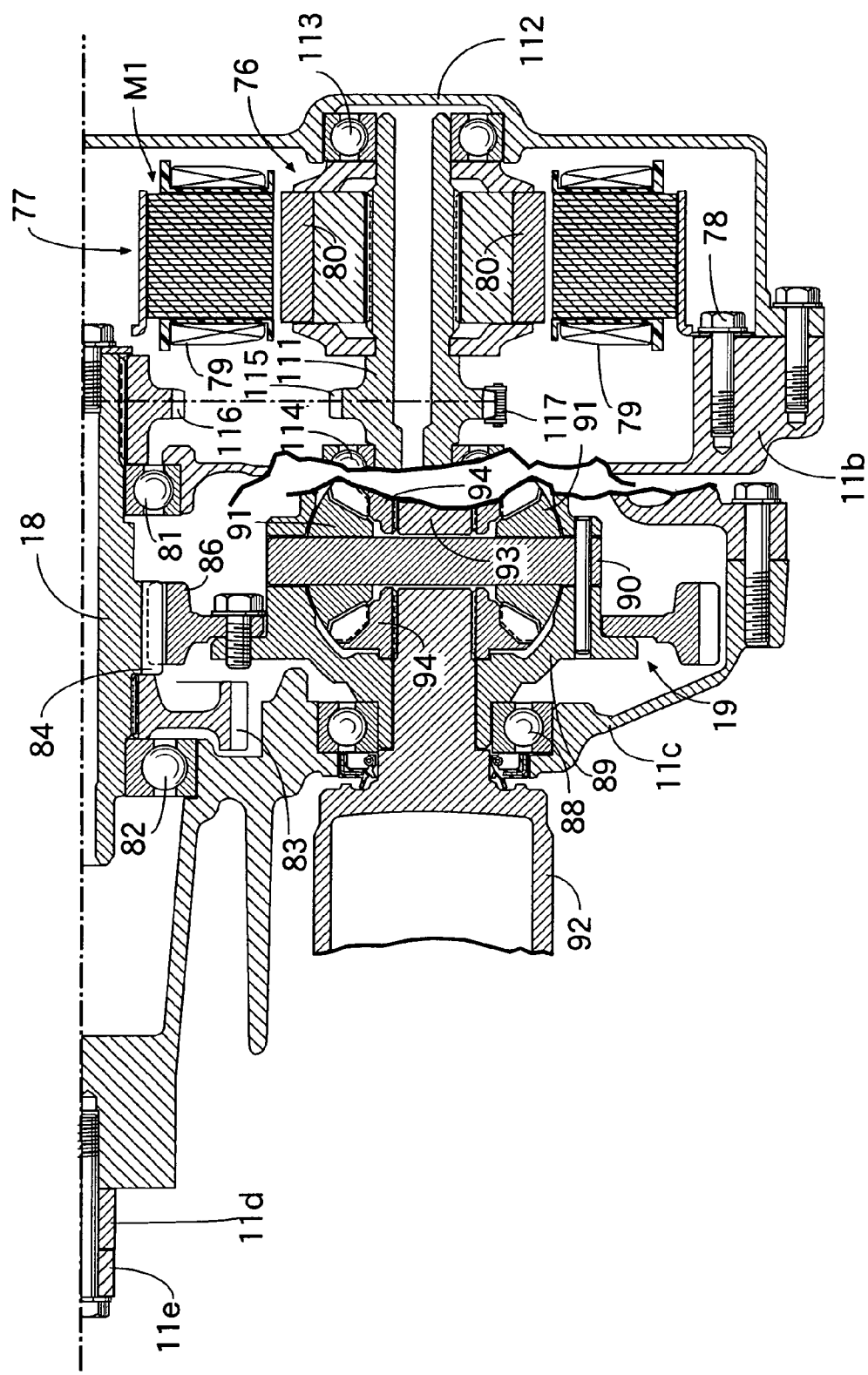
FIG. 10 is an enlarged view of part C in FIG. 7 (Embodiment 2).
Figure 11:
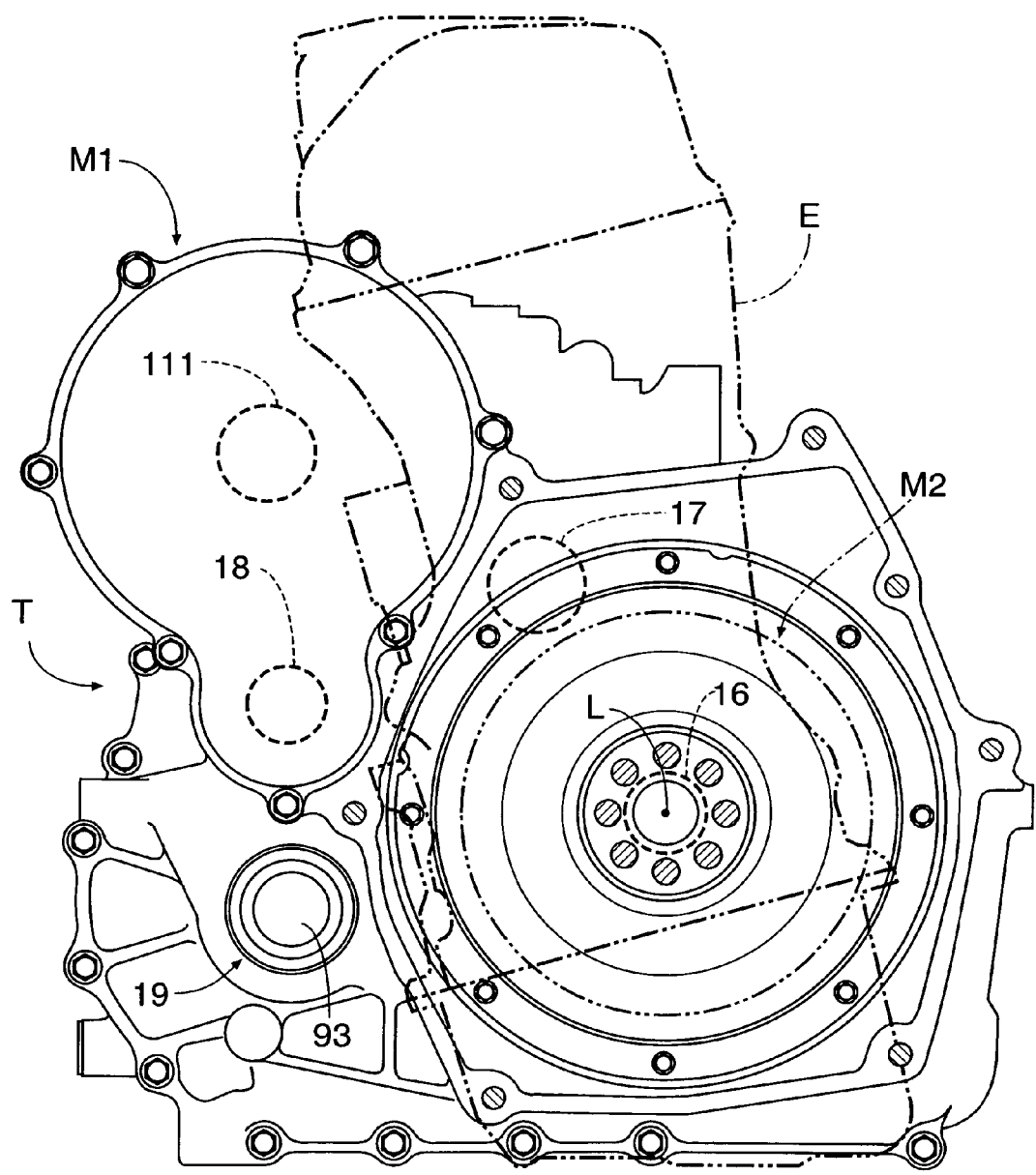
FIG. 11 is a view from arrowed line 11-11 in FIG. 7 (Embodiment 2).

As is clear from FIG. 5, the output shaft 17 is disposed above and behind the crankshaft 15 and the input shaft 16, which are disposed on the axis L, the reduction shaft 18 is disposed behind the output shaft 17, and the differential gear 19 is disposed beneath the reduction shaft 18.

Figure 2:
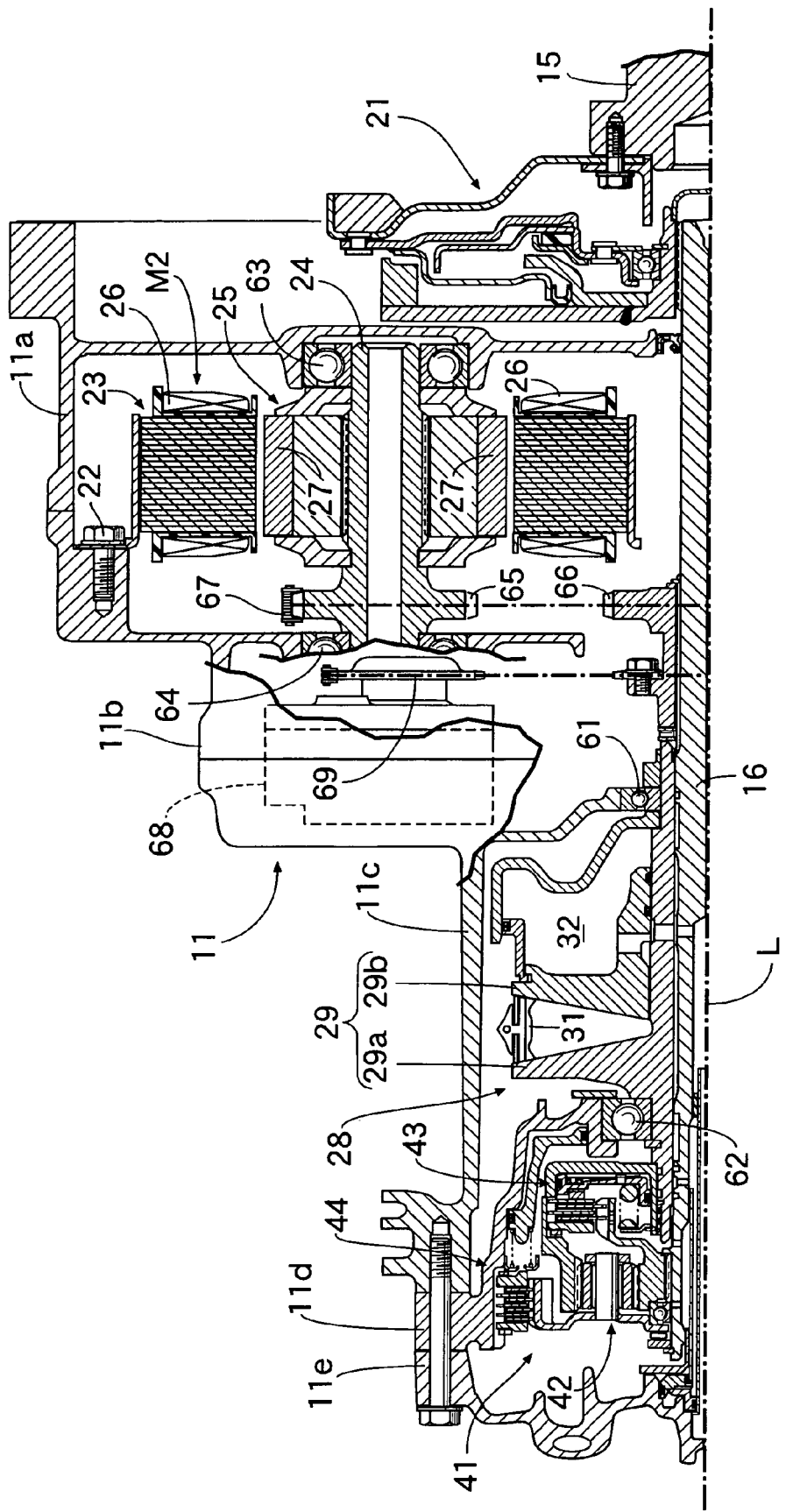
FIG. 2 is an enlarged view of part A in FIG. 1 (Embodiment 1).
Figure 3:
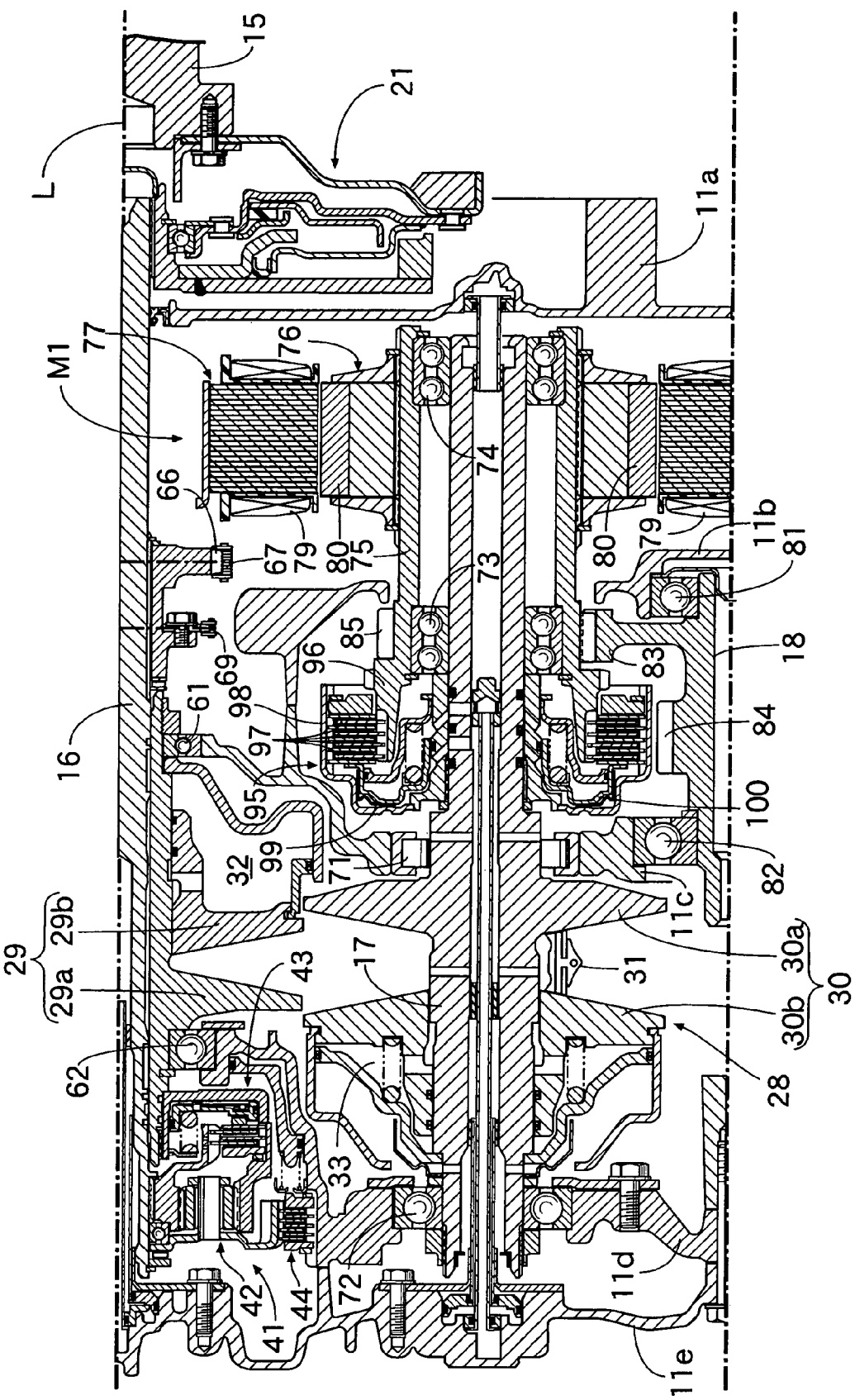
FIG. 3 is an enlarged view of part B in FIG. 1 (Embodiment 1).
Figure 4:
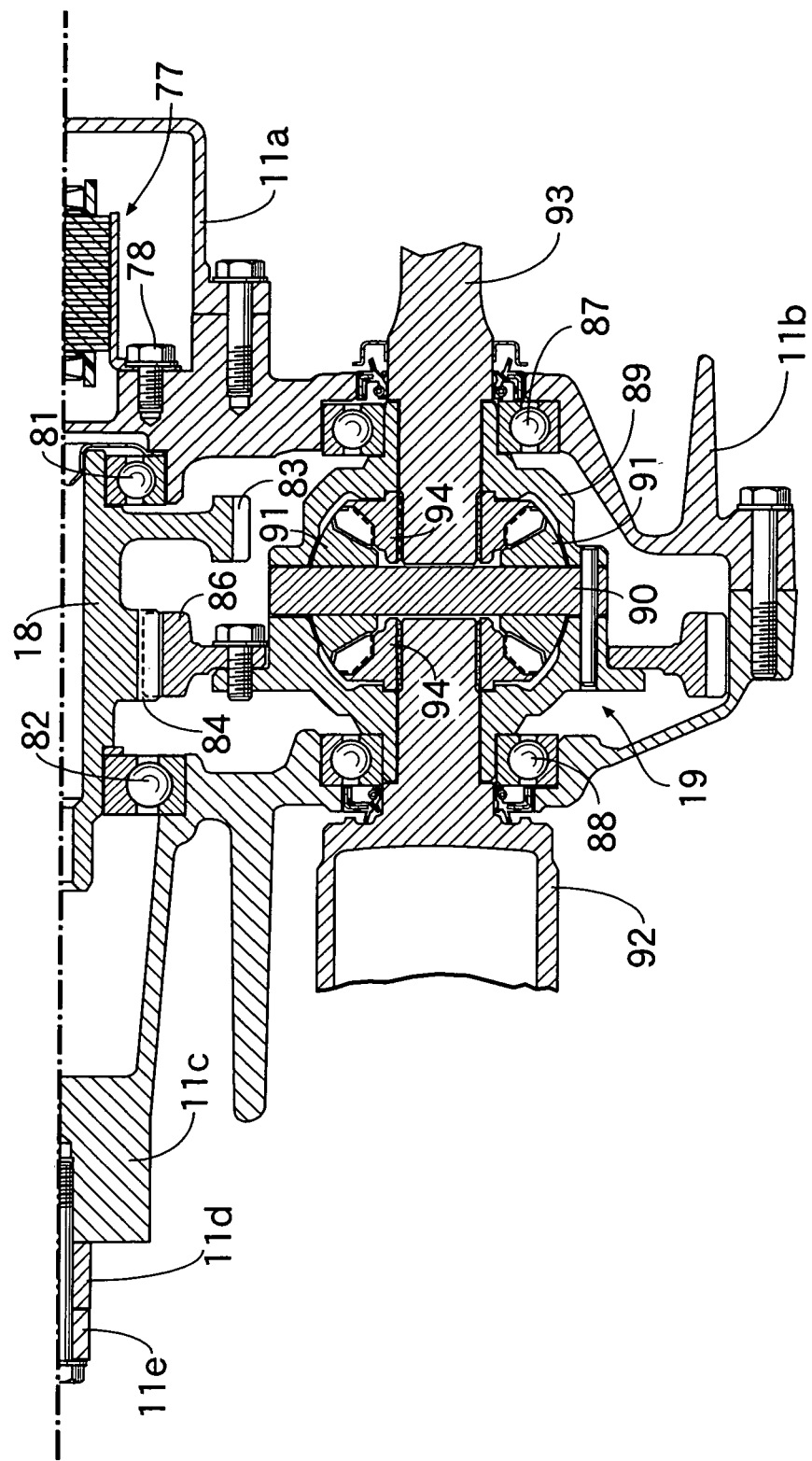
FIG. 4 is an enlarged view of part C in FIG. 1 (Embodiment 1).

As is clear from referring in addition to FIG. 2 to FIG. 4, the right-hand end of the input shaft 16 and the left-hand end of the crankshaft 15 are joined together via a damper 21 having the function of a flywheel. A starter motor M2 disposed in a space surrounded by the first casing 11a and the second casing 11b is formed from a stator 23 fixed to the second casing 11b via bolts 22, and a rotor 25 fixed to a starter motor shaft 24 supported via ball bearings 63 and 64 in front of and below the input shaft 16 (see FIG. 5), the stator 23 being provided with a plurality of coils 26, and the rotor 25 being provided with a plurality of permanent magnets 27.

A drive sprocket 65 formed integrally with the starter motor shaft 24 and a driven sprocket 66 fixed to the input shaft 16 are connected via an endless chain 67; driving the starter motor M2 allows the crankshaft 15 to be cranked via the drive sprocket 65, the endless chain 67, the driven sprocket 66, and the input shaft 16, and on the other hand the driving force of the crankshaft 15 can drive the starter motor M2 so that it functions as a generator.

A belt type continuously variable transmission 28 disposed in an internal space of the third casing 11c includes a drive pulley 29 supported on the input shaft 16, a driven pulley 30 supported on the output shaft 17, and a metal belt 31 wound around the drive pulley 29 and the driven pulley 30. The drive pulley 29 is formed from a fixed pulley half 29a that can rotate relative to the input shaft 16 but cannot move axially relative thereto, and a movable pulley half 29b that can move toward and away from the fixed pulley half 29a, the movable pulley half 29b being capable of being urged toward the fixed pulley half 29a by means of hydraulic pressure supplied to a hydraulic chamber 32. Furthermore, the driven pulley 30 is formed from a fixed pulley half 30a that is integral with the output shaft 17 and a movable pulley half 30b that can move toward and away from the fixed pulley half 30a, the movable pulley half 30b being capable of being urged toward the fixed pulley half 30a by means of hydraulic pressure supplied to a hydraulic chamber 33.

By controlling the hydraulic pressure supplied to the two hydraulic chambers 32 and 33 so as to move the movable pulley half 29b of the drive pulley 29 away from the fixed pulley half 29a and at the same time move the movable pulley half 30b of the driven pulley 30 toward the fixed pulley half 30a, the gear ratio of the belt type continuously variable transmission 28 can therefore be changed to a LO side. Furthermore, by controlling the hydraulic pressure supplied to the two hydraulic chambers 32 and 33 so as to move the movable pulley half 29b of the drive pulley 29 toward the fixed pulley half 29a and at the same time move the movable pulley half 30b of the driven pulley 30 away from the fixed pulley half 30a, the gear ratio of the belt type continuously variable transmission 28 can be changed to an OD side.

A forward/reverse travel switching mechanism 41 is disposed between the left-hand end of the input shaft 16 and the drive pulley 29. As is clear from FIG. 6, the forward/reverse travel switching mechanism 41 is formed from a planetary gear mechanism 42, a forward clutch 43, and a reverse brake 44. Engaging the forward clutch 43 provides a direct connection between the input shaft 16 and the fixed pulley half 29a of the drive pulley 29, and engaging the reverse brake 44 allows the rotation of the input shaft 16 to be reduced in speed and transmitted, as reverse rotation, to the fixed pulley half 29a of the drive pulley 29.

The planetary gear mechanism 42 includes a sun gear 45 joined to the input shaft 16, a planetary carrier 47 rotatably supported on the input shaft 16 via a ball bearing 46, a ring gear 48 relatively rotatably disposed on an outer peripheral part of the planetary carrier 47, and a plurality of pinions 50 rotatably supported on pinion shafts 49 fixed to the planetary carrier 47 and meshing with both the sun gear 45 and the ring gear 48.

The forward clutch 43 includes a clutch outer 51 joined integrally to the fixed pulley half 29a of the drive pulley 29, a clutch inner 52 joined integrally to the sun gear 45, a plurality of frictional engagement members 53 that can provide a connection between the clutch outer 51 and the clutch inner 52, a clutch piston 55 driven by means of hydraulic pressure acting on a hydraulic chamber 54 so as to bring the frictional engagement members 53 into intimate contact with each other, and a return spring 56 urging the clutch piston 55 in a return direction. Therefore, engaging the forward clutch 43 allows the rotation of the input shaft 16 to be transmitted as it is to the drive pulley 29 via the sun gear 45, the clutch inner 52, the frictional engagement members 53, and the clutch outer 51, thus making the vehicle travel forward.

The reverse brake 44 is formed from a plurality of frictional engagement members 57 that can provide a connection between the planetary carrier 47 and a fourth casing 11d, a clutch piston 59 driven by means of hydraulic pressure acting on a hydraulic chamber 58 so as to bring the frictional engagement members 57 into intimate contact with each other, and return springs 60 urging the clutch piston 59 in a return direction. Therefore, engaging the reverse brake 44 allows the planetary carrier 47 of the planetary gear mechanism 42 to be restrained by the fourth casing 11d so that it cannot rotate. In this process, since the extremity of the clutch outer 51 of the forward clutch 43 is engaged with the ring gear 48 of the planetary gear mechanism 42 so that they can rotate as a unit, the rotation of the input shaft 16 is reduced in speed and transmitted, as reverse rotation, to the drive pulley 29 via the sun gear 45, the pinions 50, the ring gear 48, and the clutch outer 54, thus making the vehicle travel in reverse.

A middle part of the input shaft 16 is supported on the third casing 11c via a ball bearing 61, and the fixed pulley half 29a of the drive pulley 29 is supported on the fourth casing 11d via a ball bearing 62. Furthermore, numeral 68 in FIG. 2 is an oil pump, which is driven by the input shaft 16 via an endless chain 69.

A middle part and a left-hand end part of the output shaft 17 are supported on the third casing 11c and the fourth casing 11d via a roller bearing 71 and a ball bearing 73 respectively. A generator/motor M1 disposed coaxially with a right-hand portion of the output shaft 17 includes a hollow generator/motor shaft 75 supported on the outer periphery of the output shaft 17 via a pair of ball bearings 73 and 74, and a stator 77 surrounding the outside of a rotor 76 fixed to the outer periphery of the right-hand end of the generator/motor shaft 75 is fixed to the second casing 11b via bolts 78. A plurality of coils 79 are provided on the stator 77 of the generator/motor M1, and a plurality of permanent magnets 80 are provided on the rotor 76.

A second reduction gear 83 and a final drive gear 84 are formed integrally with the reduction shaft 18, which is supported on the second casing 11b and the third casing 11c via a pair of ball bearings 81 and 82, the second reduction gear 83 meshing with a first reduction gear 85 formed integrally with the generator/motor shaft 75, and the final drive gear 84 meshing with a final driven gear 86 of the differential gear 19.

The differential gear 19 includes a differential case 89 supported on the second casing 11b and the third casing 11c via a pair of ball bearings 87 and 88, and the final driven gear 86 is fixed to the outer periphery of the differential case 89. A pair of differential pinions 91 are rotatably supported on a pinion shaft 90 fixed to the differential case 89, and a pair of differential side gears 94 fixed to opposing end parts of a left axle 92 and a right axle 93 running through the second casing 11b, the third casing 11c, and the differential case 89 each mesh with the pair of differential pinions 91.

A starting clutch 95 that connects the generator/motor shaft 75 to the output shaft 17 includes a clutch inner 96 fixed to the generator/motor shaft 75, a clutch outer 97 fixed to the output shaft 17, frictional engagement members 98 supported on the clutch inner 96 and the clutch outer 97, a clutch piston 100 operated by means of hydraulic pressure supplied to a hydraulic chamber 99 so as to bring the frictional engagement members 98 into intimate contact with each other, and a return spring 101 returning the clutch piston 100 to an original position. Engaging the starting clutch 95 therefore allows the driving force of the output shaft 17 to be transmitted to the first reduction gear 85 of the generator/motor shaft 75, thus enabling travel by means of the driving force of the engine E.

The operation of the first embodiment having the above-mentioned arrangement is now explained.

When the vehicle travels by means of the engine E, the driving force of the crankshaft 15 of the engine E is transmitted via the pathway: damper 21→ input shaft 16→ forward/reverse travel switching mechanism 41→ belt type continuously variable transmission 28→ output shaft 17→ starting clutch 95→ first reduction gear 85→ second reduction gear 83→ reduction shaft 18→ final drive gear 84→ final driven gear 86→ differential gear 19→ left and right axles 92 and 93. In this process, if the forward clutch 43 of the forward/reverse travel switching mechanism 41 is engaged, the vehicle travels forward, if the reverse brake 44 is engaged, the vehicle travels in reverse, and by controlling the belt type continuously variable transmission 28 any gear ratio can be obtained.

When traveling by means of the engine E, rotation of the output shaft 17 is transmitted to the generator/motor shaft 75 via the starting clutch 95, thus allowing the rotor 76 of the generator/motor M1 to rotate idle. In this process, if the generator/motor M1 is driven forward, the driving force of the rotor 76 can assist forward travel by means of the engine E. If the generator/motor M1 is driven in reverse, the driving force of the rotor 76 can assist reverse travel by means of the engine E.

If the generator/motor M1 is driven forward in a state in which the starting clutch 95 is disengaged, the driving force of the generator/motor M1 is transmitted via the pathway: generator/motor shaft 75→ first reduction gear 85→ second reduction gear 83→ reduction shaft 18→ final drive gear 84→ final driven gear 86→ differential gear 19→ left and right axles 92 and 93, thus allowing the vehicle to travel forward, and if the generator/motor M1 is driven in reverse, the vehicle can be made to travel in reverse.

When traveling by means of the generator/motor M1 as described above, since the driving force of the generator/motor M1 does not drag along the engine E, the input shaft 16, the forward/reverse travel switching mechanism 41, and the output shaft 17, the so-called leg shaft drive becomes possible, and the load on the generator/motor M1 is reduced, thus contributing to a saving in power consumption. Furthermore, when the generator/motor M1 carries out regenerative braking accompanying deceleration of the vehicle, since the driving force transmitted back from a wheel to the generator/motor M1 does not drag along the engine E, the input shaft 16, the forward/reverse travel switching mechanism 41, and the output shaft 17, the energy recovery efficiency can be enhanced.

As hereinbefore described, since the generator/motor M1 and the starter motor M2 are disposed at positions sandwiched between the engine E and the transmission T, that is, the same positions as for the conventional sandwiched generator/motor type generator/motor, the leg shaft drive becomes possible merely by a slight modification of the sandwiched generator/motor type transmission. Furthermore, since the generator motor M1 and the starter motor M2 are both in a position off the axis L of the input shaft 16 and overlap each other when viewed in a direction perpendicular to the axis L, any increase in the dimension in the axis L direction of the transmission T can be suppressed effectively. Moreover, as is clear from FIG. 5, since the generator/motor M1 and the starter motor M2 hardly protrude from the outline of the engine E and the transmission T in the axis L direction, any increase in the dimensions in the radial direction can also be suppressed. Furthermore, since the generator/motor M1 and the starter motor M2 are sandwiched between the engine E and the transmission T, which have a large heat capacity, ease of cooling thereof can readily be guaranteed.

EMBODIMENT 2

FIG. 7 to FIG. 11 show a second embodiment of the present invention. In the second embodiment, components corresponding to the components of the first embodiment are denoted by the same reference numerals and symbols as those of the first embodiment, and duplication of the explanation is thus omitted. It is mainly the parts of the second embodiment that are different from those of the first embodiment that are explained below.

Firstly, whereas in the first embodiment the starter motor M2 is disposed in a position off the axis L of the input shaft 16, in the second embodiment a starter motor M2 is positioned on an axis L of an input shaft 16. The starter motor M2 is disposed between a crankshaft 15 and a damper 21, a stator 23 thereof is fixed to a first casing 11a via bolts 22, and a rotor 25 thereof is fixed to the crankshaft 15. Therefore, an engine E can be started efficiently by directly cranking the crankshaft 15 by means of the rotor 25 of the starter motor M1, and the rotor 25 can be driven by means of the engine E, thus making the starter motor M2 function as a generator. Moreover, since the starter motor M2 is disposed coaxially with the crankshaft 15, it is possible to prevent the starter motor M2 from interfering with the crankshaft 15 or the input shaft 16.

Furthermore, although in the first embodiment the generator/motor M1 is disposed coaxially with the output shaft 17, in the second embodiment a generator/motor M1 is disposed in a position away from an output shaft 17. That is, as is clear from FIG. 11, the output shaft 17 is disposed above and behind the crankshaft 15 and the input shaft 16, which are disposed on the axis L, a generator/motor shaft 111 is disposed above and behind the output shaft 17, a reduction shaft 18 is disposed beneath the generator/motor shaft 111, and a differential gear 19 is disposed beneath the reduction shaft 18.

The generator/motor M1, which is housed in a space surrounded by a motor cover 112 and a second casing 11b, the motor cover 112 being separate from a first casing 11a, includes the generator/motor shaft 111, which is supported on the motor cover 112 and the second casing 11b via ball bearings 113 and 114, and a stator 77 surrounding a rotor 76 fixed to the generator/motor shaft 111 is fixed to the second casing 11b via bolts 78. A drive sprocket 115 provided integrally with the generator/motor shaft 111 and a driven sprocket 116 fixed to the reduction shaft 18 are connected via an endless chain 117, and power transmission between the generator/motor M1 and the reduction shaft 18 is carried out via the endless chain 117.

Furthermore, although in the first embodiment the starting clutch 95 has a function of providing connections between the output shaft 17 and the first reduction gear 85 and generator/motor shaft 75, a starting clutch 95 of the second embodiment only has a function of providing a connection between the output shaft 17 and a first reduction gear 85. That is, the starting clutch 95 includes a clutch inner 119 that is integral with the first reduction gear 85, which is supported on the outer periphery of the output shaft 17 via a ball bearing 118, a clutch outer 120 that is integral with the output shaft 17, frictional engagement members 121 supported on the clutch inner 119 and the clutch outer 120, a clutch piston 123 operated by means of hydraulic pressure supplied to a hydraulic chamber 122 so as to bring the frictional engagement members 121 into intimate contact with each other, and a return spring 124 for returning the clutch piston 123 to an original position. Engaging the starting clutch 95 therefore allows the driving force of the output shaft 17 to be transmitted to the first reduction gear 85, thus enabling travel by means of the driving force of the engine E.

Whereas in the first embodiment the driving force of the generator/motor M1 is transmitted to the first reduction gear 85, in the second embodiment the driving force of the generator/motor M1 is transmitted to the reduction shaft 18, and whereas in the first embodiment the driving force of the starter motor M2 is transmitted to the input shaft 16 via the endless chain 67, in the second embodiment the driving force of the starter motor M2 is transmitted directly to the crankshaft 15, but other operations are the same.

In accordance with this second embodiment also, since the generator/motor M1 and the starter motor M2 are disposed so as to be sandwiched between the engine E and the transmission T, leg shaft drive becomes possible merely by a slight modification of the sandwiched generator/motor type transmission. Furthermore, since the generator/motor M1 and the starter motor M2 overlap each other when viewed in a direction perpendicular to the axis L of the input shaft 16, not only is it possible to suppress effectively any increase in the dimension in the axis L direction of the transmission T, but, as is clear from FIG. 11, since the generator motor M1 and the starter motor M2 hardly protrude from the outline in the axis L direction of the engine E and the transmission T, any increase in the dimensions in the radial direction can also be suppressed and, moreover, since the generator/motor M1 and the starter motor M2 are sandwiched between the engine E and the transmission T, which have a large heat capacity, the cooling effect is improved.

Although embodiments of the present invention are explained above, the present invention can be modified in a variety of ways as long as the modifications do not depart from the spirit and scope thereof.

For example, in the first embodiment the driving force of the generator/motor M1 is transmitted to the reduction shaft 18 via the first and second reduction gears 85 and 83, but it may be transmitted via an endless chain or an endless belt, and in the second embodiment the driving force of the generator/motor M1 is transmitted to the reduction shaft 18 via the endless chain 117, but it may be transmitted via a gear train or an endless belt.

Furthermore, the transmission T of the embodiments is a continuously variable transmission having a belt type continuously variable transmission 28, but it may be any of a continuously variable transmission having any other structure, a stepped automatic transmission, or a manual transmission.

The invention claimed is:

1. A hybrid vehicle comprising:
an engine (E) having a crankshaft (15);
a transmission (T) that has an input shaft (16) joined coaxially to the crankshaft (15) and an output shaft (17) disposed in parallel to the input shaft (16), and is capable of changing the gear ratio between the input shaft (16) and the output shaft (17); and
a generator/motor (M1) that is disposed at a position sandwiched between the engine (E) and the transmission (T) and a position off an axis (L) of the input shaft (16), and transmits its driving force to any position of a power transmission pathway between the output shaft (17) and a differential gear (19); and a starter motor (M2) that can crank the crankshaft (15) and is disposed at a position sandwiched between the engine (E) and the transmission (T);

the vehicle being capable of traveling by means of either one or both of the driving force of the engine (E) and the driving force of the generator/motor (M1) and at least parts of the generator/motor (M1) and the starter motor (M2) overlapping each other when viewed in a direction perpendicular to the axis (L).

2. The hybrid vehicle according to claim 1, wherein the generator/motor (M1) is disposed coaxially with the output shaft (17).

3. The hybrid vehicle according to claim 1 or 2, wherein the starter motor (M2) is disposed coaxially with the crankshaft (15).

* * * * *